(12) United States Patent
Goyal et al.

(10) Patent No.: US 11,914,499 B2
(45) Date of Patent: Feb. 27, 2024

(54) SYSTEMS AND METHODS FOR PREPARING TRACE DATA

(71) Applicants: STMICROELECTRONICS APPLICATION GMBH, Aschheim-Dornach (DE); STMicroelectronics S.r.l., Agrate Brianza (IT); STMicroelectronics International N.V., Geneva (CH)

(72) Inventors: Avneep Kumar Goyal, Greater Noida (IN); Thomas Szurmant, Munich (DE); Misaele Marletti, Druento (IT); Alessandro Daolio, Sannazzaro de' Burgondi (IT)

(73) Assignees: STMicroelectronics Application GMBH, Aschheim-Dornach (DE); STMicroelectronics S.r.l., Agrate Brianza (IT); STMicroelectronics International N.V., Geneva (CH)

( * ) Notice: Subject to any disclaimer, the term of this patent is extended or adjusted under 35 U.S.C. 154(b) by 173 days.

(21) Appl. No.: 17/515,212

(22) Filed: Oct. 29, 2021

(65) Prior Publication Data

US 2023/0133912 A1    May 4, 2023

(51) Int. Cl.
  *G06F 11/36*    (2006.01)
  *G06F 11/34*    (2006.01)
  *G06F 11/30*    (2006.01)

(52) U.S. Cl.
  CPC ...... *G06F 11/3636* (2013.01); *G06F 11/3082* (2013.01); *G06F 11/3466* (2013.01)

(58) Field of Classification Search
  CPC ............ G06F 11/3065; G06F 11/3072; G06F 11/3082; G06F 11/3466; G06F 11/3471; G06F 11/3475; G06F 11/3476; G06F 11/348
  See application file for complete search history.

(56) References Cited

U.S. PATENT DOCUMENTS

| | | | |
|---|---|---|---|
| 6,708,173 B1* | 3/2004 | Behr | G06F 11/3636 717/124 |
| 7,080,283 B1* | 7/2006 | Songer | G06F 11/3636 714/30 |
| 7,581,144 B2* | 8/2009 | Kimura | G06F 11/3636 714/45 |
| 2002/0078264 A1 | 6/2002 | Eberhard | |
| 2003/0229823 A1* | 12/2003 | Swaine | G06F 11/3636 714/E11.178 |
| 2005/0268177 A1* | 12/2005 | John | G11C 29/56008 714/47.1 |
| 2006/0184835 A1* | 8/2006 | Al-Omari | G06F 11/348 714/45 |
| 2008/0155351 A1* | 6/2008 | Flake | G06F 11/3485 714/45 |
| 2008/0288741 A1 | 11/2008 | Lee et al. | |

(Continued)

*Primary Examiner* — Gabriel Chu
(74) *Attorney, Agent, or Firm* — Slater Matsil, LLP

(57) ABSTRACT

A trace-data preparation circuit including a filtering circuit to receive traced memory-write data and a First In First Out buffer coupled with the filtering circuit to receive selected memory-write data filtered by the filtering circuit. The trace-data preparation circuit further including a data compression circuit to provide packaging data to a packaging circuit that groups the selected memory-write data.

24 Claims, 4 Drawing Sheets

(56) References Cited

U.S. PATENT DOCUMENTS

| | | |
|---|---|---|
| 2010/0218051 A1 | 8/2010 | Walker et al. |
| 2014/0068344 A1 | 3/2014 | Miller |
| 2014/0108872 A1* | 4/2014 | Palmer ................ G06F 11/3636 |
| | | 714/45 |
| 2015/0046617 A1* | 2/2015 | Shirlen ............... G06F 11/3466 |
| | | 710/117 |
| 2016/0140014 A1* | 5/2016 | Lampert ............. G06F 11/0751 |
| | | 714/45 |
| 2016/0232073 A1* | 8/2016 | Cook .................. G06F 11/3065 |
| 2017/0308491 A1* | 10/2017 | Gibbs ................. G06F 13/4068 |
| 2022/0334963 A1* | 10/2022 | Patel .................. G06F 12/0877 |

* cited by examiner

SYSTEMS AND METHODS FOR PREPARING TRACE DATA

TECHNICAL FIELD

The present invention relates generally to systems and methods for providing trace data.

BACKGROUND

It is often advantageous to trace processing steps for components of a system on a chip or other device. However, capturing tracing data can severely tax the resources of a system thus presenting many challenges for comprehensive data generation. There is a need for systems, devices, and methods that provide trace data more efficiently to meet demands for comprehensive data preparation.

SUMMARY

In accordance with embodiments, a system to provide filtered trace data includes a processor; a Static Random Access Memory (SRAM) controller; a first data-preparation circuit coupled with the processor to receive traced memory-write data from the processor, the first data-preparation circuit being configured to filter unselected traced memory-write data from selected traced memory-write data; a second data-preparation circuit coupled with the SRAM controller to receive traced memory-write data from the SRAM controller, the second data-preparation circuit configured to filter unselected traced memory-write data from selected traced memory-write data; a data-collection network configured to receive the selected traced memory-write data from the first data-preparation circuit and to receive the selected traced memory-write data from the second data-preparation circuit; and an output interface coupled with the data-collection network to output the selected traced memory-write data from the first data-preparation circuit and the selected traced memory-write data from the second data-preparation circuit.

In accordance with embodiments, the system further includes wherein the processor includes a tightly coupled memory and the traced memory-write data from the processor corresponds to memory-write data operations for the tightly coupled memory.

In accordance with embodiments, the system further includes wherein the SRAM controller is in communication with a corresponding processor or a non-processor master and the traced memory-write data from the SRAM controller corresponds to memory-write data operations for memory accessible by the processor or the non-processor master.

In accordance with embodiments, the system further includes wherein the traced memory-write-data from the processor includes addressing bits, data bits, and control bits, and the traced memory-write data from the SRAM controller includes addressing bits, data bits, and control bits.

In accordance with embodiments, the system further includes wherein the first data-preparation circuit is configured to identify the selected traced memory-write data of the traced memory-write data from the processor based on a mapping of selected memory locations.

In accordance with embodiments, the system further includes wherein the second data-preparation circuit is configured to identify the selected memory-write data of the traced memory-write data from the SRAM controller based on mapping of selected memory locations.

In accordance with embodiments, the system further includes wherein the first data-preparation circuit includes a filtering circuit to filter the unselected traced memory-write data from the selected traced memory-write data and a First In First Out buffer to store the selected traced memory-write data.

In accordance with embodiments, the system further includes wherein the first data-preparation circuit is configured to assert a backpressure signal provided to the processor in response to the First in First out buffer reaching a full capacity.

In accordance with embodiments, the system further includes wherein the first data-preparation circuit includes a data compressions circuit configured to identify packets of selected traced memory-write data and provide packaging data to a data packaging circuit of the first data-preparation circuit to group the selected traced memory-write data into packets with address and control information.

In accordance with embodiments, the system further includes wherein the first data-preparation circuit further includes a time stamp circuit configured to add timestamps to the packets.

In accordance with embodiments, the system further including a trace-out controller coupled with the data packaging circuit to receive packets and provide them to the data-collection network.

In accordance with an embodiment, a method to filter trace data includes receiving traced memory-write data; identifying selected memory-write data; packaging the selected memory-write data into packets; and outputting the packets to a development tool.

In accordance with embodiments, the method further includes converting the packets into a standard format for output.

In accordance with embodiments, the method further includes wherein identifying selected traced memory-write data includes selecting memory-write data for selected memory locations.

In accordance with embodiments, the method further includes wherein the traced memory-write data includes address bits, data bits and control bits.

In accordance with embodiments, the method further includes wherein the selected memory-write data is packaged into packets with control bytes.

In accordance with embodiments, the method further includes analyzing the selected memory-write data to determine how to package the selected memory-write data.

In accordance with embodiments, the method further includes wherein analyzing the selected memory-write data includes determining whether the selected memory write data corresponds to memory-write data operations directed to continuous addresses, directed to discontinuous addresses, and are of a same type.

In accordance with embodiments, a trace-data preparation circuit includes a filtering circuit configured to receive traced memory-write data; a First In First Out buffer coupled with the filtering circuit to receive selected memory-write data filtered by the filtering circuit; a data compression circuit coupled with the First in First Out buffer configured to provide packaging data based on content of the selected memory-write data; a packaging circuit configured to group the selected memory-write data into packets based on the packaging data; and an output controller configured to receive packets from the packaging circuit and convert the packets into a standard protocol format.

In accordance with embodiments, the trace-data preparation circuit includes a timestamp circuit configured to add a time stamp to every nth packet, n being an integer.

In accordance with embodiments, the trace-data preparation circuit further includes wherein an output bus for the packaging circuit is configured to transmit more bits per cycle than an input bus for the packaging circuit.

In accordance with embodiments, the trace-data preparation circuit further includes, wherein the traced memory-write data received by the filtering circuit includes addressing bits, data bits, and control bits.

In accordance with embodiments, the trace-data preparation circuit further includes, wherein the filtering circuit includes an address input to receive addressing bits, a data input to receive data bits, a control input to receive control bits, an addressing output to provide addressing bits, a data output to provide data bits, and a control output to provide control bits.

In accordance with embodiments, the trace-data preparation circuit further includes a concatenation circuit to receive addressing bits from the filtering circuit, data bits from the filtering circuit, and control bits from the filtering circuit, the concatenation circuit being configured to concatenate addressing bits, data bits, and control bits and provide them to the First in First Out Buffer.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
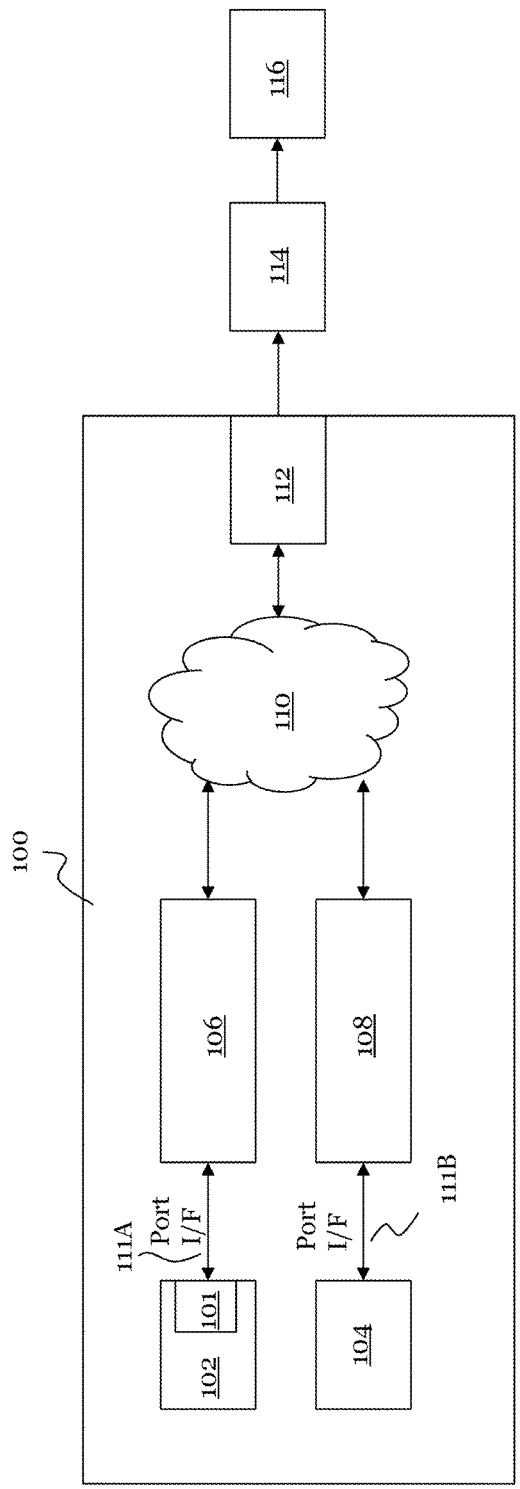
FIG. 1 depicts a system to provide filtered trace data consistent with embodiments.

Systems on a Chip ("SoC") are used in a wide variety of applications. At various points during the lifestyle of a SoC, it may be advantageous to test its performance using external tools. This testing may occur for many different types of processes including, but not limited to, calibration, diagnostics, and development. External tools may be used for tracing the different performance steps occurring internally during operation while a SoC performs a function. Using this information a designer can spot potential issues that might adversely impact performance. Data tracing can thus give a designer, technician or others a window into the internal operation of a SoC, which helps designers, technicians or others improve, debug, calibrate, or fix potential issues.

By way of example, it may be beneficial to synchronize traced data from a SoC with other external information to gain perspective on potential issues. For example, trace data may be used in conjunction with visual data to diagnose or calibrate parking assistance operations in a motor vehicle. The trace data may be corresponded with sensor data or video data of a subject vehicle performing a parking maneuver. The traced data received from the SoC may be synched with sensor and video data to track real-world stimuli and how the SoC responds to that stimuli. This data may aid development, calibration, or troubleshooting.

The tracing data provided to an external tool may advantageously include real-time meta data updated by system software internal to a SoC. System software applications may be running simultaneously on multiple cores inside the SoC. These cores may continuously update data at many address locations of a system memory map as operations are performed. These locations may be, for example, tightly coupled memories or system RAMs.

For data tracing, the memory-writing address and data information for these locations may be traced and provided to external tools to trace the operations of the processor and non-processor functional blocks. The external tools may then use the traced memory-writing data with address and control information to follow the values of these memory locations as they are updated to run local algorithms that provide information about the behaviour of the system. This can then be analyzed for performance. Writing data may also be generated by other non-CPU masters, such as Direct Memory Access storage. It may be advantageous to also trace memory-writing data for these locations and provide the traced memory-writing data to external tools.

As will be appreciated, the volume of data created by the number of operations performed by a SoC can quickly become burdensome for trace data collecting efforts. Many SoCs may simultaneously run multiple software applications on multiple cores that write to large numbers of memory locations. At the same time, multiple non-CPU master (such as DMA controller) may also perform write operations. The sheer number operations performed by a SoC may overwhelm a system attempting to capture trace data. In some cases, this may cause data overflows and critical tracing data may be lost.

In many applications, lost tracing data severely hampers efforts to evaluate tracing information. In the development of electric, hybrid, and conventional gasoline-based vehicles, for example, the requirements for instrumentation to measure internal Electronic Control Unit signals are very high. As is the need for comprehensive trace data. Without comprehensive data, diagnostic or calibration operations may be unsuccessful or inaccurate. The need for comprehensive tracing data is also applicable on many, or all, main application fields for vehicles including, but not limited to Automotive Engine Control, Body and Chassis, and other fields like Advanced Driver Assistance Systems. Many fields in addition to the automotive industry also benefit from comprehensive data for runtime measurements to provide tracing data.

Known approaches to trace-data preparation do little to filter the trace data before it is delivered to an external tool. A SoC may simultaneously run multiple programs on multiple cores and utilize multiple non-CPU masters for writing. However, an external tool may only be interested in some of the processes occurring on a SoC at a given time. So, while comprehensive data may be required for some memory locations, an external tool may never use trace data related to updates for many (if not most) of the tightly coupled memories ("TCMs") and on chip Static Random Access Memory ("SRAM") present on a SoC. By tailoring trace data collection to specific data needs, a system to prepare trace data can provide comprehensive data with improved reliability and improved efficiency (in terms of speed and hardware requirements for operation).

This may be leveraged to provide more efficient systems and methods for providing trace data. Unwanted data may be filtered out and more resources may be dedicated to collecting more comprehensive data from locations of interest. Data tracing may thus be improved by allowing for high granularity filtering to select only desired data locations to trace out.

This can be beneficial in a wide spectrum of fields including but not limited to automotive fields. For example, instrumentation requirements for Automotive Applications may benefit from the collection of updated data written in the in-system memories by the system software. In many cases, all comprehensive data from selected memory locations is needed. But, updates related to other memory location may not be needed. To meet this requirement, for comprehensive data from selected memory locations, embodiments consistent with this disclosure allow fine granularity filtering to remove unwanted memory write data from the data provided to an external tool. Additionally, data compression and packetization may also enhance data trace systems and methods.

FIG. 1 depicts a system to provide filtered trace data consistent with embodiments.

The system 100 to provide filtered trace data may be contained on a system on a chip. In various embodiments, the system 100 to provide filtered trace data may comprise a processor 102. The processor 102 may be configured to execute software instructions stored in a memory (not shown). During execution, the processor may write to memory locations. The processor may comprise tightly coupled (TCM) memory 101.

Memory-write data, address and control information for the TCM memory (or other memory locations) may include addressing bits, data bits and control bits. Each of these may be carried on a separate bus. And, as will be appreciated, the number of bits for each may vary in various embodiments. The system may further comprise an SRAM controller 104 (Static Random Access Memory controller). The SRAM controller may also process memory-write data that is beneficial to capture for data-tracing. Such memory-write data may also comprise addressing bits, data bits, and control bits that may be carried on separate busses.

In various embodiments, a first data-preparation circuit 106 may be coupled with the processor 102 to receive traced memory-write-data from the processor 102. The traced memory-write data may comprise data for writing to the TCM memory 101 of the processor 102. Duplicate write data may be provided to the first data-preparation circuit 106.

In various embodiments a bus, or busses delivering signals carrying the memory write data may be coupled with the first data-preparation circuit 106 to receive the memory write data. Communication between the processor 102 and the first data-preparation circuit 106 may be accomplished using a memory write data port interface 111A such as, but not limited to, a Memory Reconstruction Port ("MRP"), which is available in ARM Cortex processors and in-system memory controllers. In various embodiments, the data port interface 111A may be integrated into the processor 102. A write data memory port interface may provide various signals via an. address bus, data bus, and control bus. The memory-write data received by data-preparation circuits may be referred to as traced memory-write data.

In various embodiments, the first data-preparation circuit 106 may provide backpressure signals when its pipeline is filled and it cannot process more data from the processor 102. In various embodiments, memory write data port interface 111A may provide the first data-preparation circuit 106 the write data for the TCM memory 101 of the processor 102.

In various embodiments, the first data-preparation circuit 106 may perform a filtering operation to filter out some of the traced memory-write data at selected address locations. This may be beneficial to limit the data ultimately provided to an external tool and reduce the bandwidth needed for a tracing operation. In various embodiments, the first data-preparation circuit 106 may be configured to filter unselected traced memory-write data that corresponds to memory-write operations for unselected memory locations from selected traced memory-write data corresponding to memory-write operations for selected address locations. In various embodiments only traced memory-write data for selected locations will be passed by the first data-preparation circuit 106.

In various embodiments, the system wo may comprise additional data-preparation circuits. Additional data-preparation circuits may be coupled with additional sources that generate memory write data. And, the system may comprise additional memory write data port interfaces (such as, but not limited to, MRPs). Additional memory write data port interface may operate as memory write data port interface 111A. And, additional data-preparation circuits may also operate to filter memory-write data that they receive.

By way of example, the system wo may comprise a second data-preparation circuit 108 coupled with the SRAM controller 104. The second data-preparation circuit 108 may receive traced memory-write data from the SRAM controller 104. Memory write data port interface 111B, which may comprise, an MRP, may carry traced memory-write data from the SRAM controller 104 to the second data-preparation circuit 108.

The second data-preparation circuit 108 may be configured to filter out unselected traced memory-write data from selected traced-memory write locations. Selection, in various embodiments, may be determined by the memory location intended for the memory-write data. Memory-write data for selected memory locations may be passed by the second data-preparation circuit 108 while memory-write data for other memory locations is not passed. In various embodiments, coupling between the SRAM controller 104 and the second data-preparation circuit 108 may be accomplished using a data port interface 111B, which may comprise an MRP.

In various embodiments, the system wo may further comprise a data-collection network no configured to receive the selected traced memory-write data from the first data-preparation circuit 106 and to receive the selected traced memory-write data from the second data-preparation circuit 108. The data-collection network no may comprise components dispersed throughout a SoC. In various embodiments, the data-collection network may comprise memory to store the selected memory-write data.

The system wo may further comprise an output interface 112 coupled with the data-collection network no to output the selected memory-write data from the first data-preparation circuit 106 and the selected memory-write data from the second data-preparation circuit 108. The output interface 112 may comprise a high-speed serial trace out controller interface. High speed serial trace data may be provided to an external development tool, which may comprise a measurement hardware base module 114 and a measurement and calibration tool 116.

The processor 102 may comprises TCM memory 101, and the traced memory-write data from the processor 102 may be traced from memory-write data for the TCM memory 101. TCM memory may comprise low latency memory with dedicated connections with a core. In various embodiments, data-preparation circuits may receive memory-write data for other types of memories in addition to TCM memory, or instead of, TCM memory.

In various embodiments, the SRAM controller 104 is in communication with a Direct Memory Access circuit and the traced memory-write data from the SRAM controller 104 is traced from memory-write data for memory accessible by the Direct Memory Access Circuit. The traced memory-write-data from the SRAM controller 104 may comprise addressing bits, data bits, and control bits. As will be appreciated, these may be carried on an addressing bus, data bus, and control bus respectively.

In various embodiments, the first data-preparation circuit 106 is configured to identify the selected memory-write locations of the traced memory-write data from the processor 102 based on a mapping of selected memory locations. For example, each memory location of the TCM memory 101 may be mapped to single bit. If that bit has a pass setting (which may be high or low in different embodiments), the memory-write data for that address location may be passed by the first data-preparation circuit 106. If the bit corresponding to a given memory location does not have a pass setting, then memory-write data for that memory location may not be passed.

As will be appreciated, other data preparation circuits (such as the second data-preparation circuit 108) may operate in a similar way. Mappings for the data preparation circuit may correspond to the memory locations accessible by the source coupled to the data-preparation circuit. For example, in various embodiments, the second data-preparation circuit 108 may be configured to identify selected memory-write location of the traced memory-write data received from the SRAM controller 104 based on a mapping of selected memory locations. The mapping may correspond memory locations accessible to the SRAM for writing to filter bits that indicate whether or not to pass memory-write data intended for that location.

In various embodiments, mappings may be programmable by the external tool. This may allow the mappings to be adjusted depending on the external tool coupled with the system 100. The external tool may thus select which memory locations are relevant for its purposes so only memory-write location that are relevant are ultimately passed to the external tool. Access to a mapping, which may be stored in memory for the system wo may be accessible to an external tool by means of the bus system that provides the trace data to the external.

It should also be appreciated that mapping provides but one possible way to filter traced memory-write data received by a data preparation circuit. Data preparation circuits may use other means to filter out unselected memory-write location data and pass selected memory-write data. One such additional example is a set of registers. Programmable registers can be used for programming of filter locations. Additional approaches to filtering may also be utilized.

Figure 2:
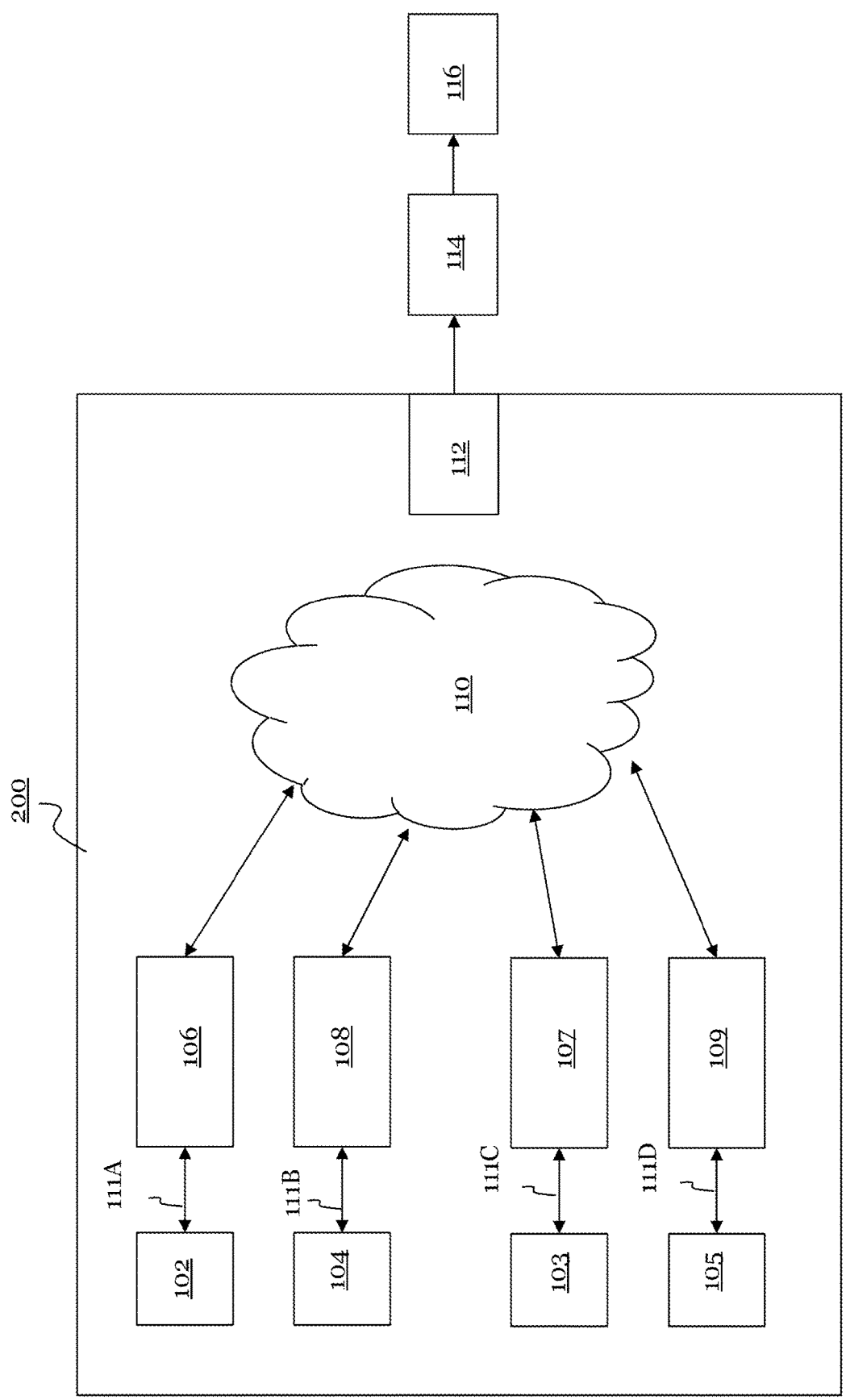
FIG. 2 depicts a system to provide filtered trace data consistent with embodiments.

FIG. 2 depicts a system to provide filtered trace data consistent with embodiments.

The system 200 comprises additional data-preparation circuits. Unless otherwise specified, features designated with the same numeric identifier in this disclosure may comprise the same feature as identified elsewhere in this disclosure by the same numeric identifier. The system 200 may comprise a third memory-write source 103 and a fourth memory-write source 105. As will be appreciated, additional sources may comprise additional cores, which may comprise additional tightly coupled memories (not depicted in FIG. 2).

Additional sources may also comprise additional SRAM controllers or other memory-write sources. By way of example, the third memory-write source 103 may comprise a processor. The fourth memory-write source 105 may comprise an SRAM controller. The traced memory-write data may comprise addressing bits, data bits, and control bits, which may be carried on separate busses.

The third memory-write source 103 may be coupled with a third data-preparation circuit 107 by a memory port interface 111C (such as an MRP). And, the fourth memory-write source 105 may be coupled with a fourth data-preparation circuit 109 by a memory write data port interface 111D (such as an MRP). The third data-preparation circuit 107 may be configured to filter unselected memory-write locations received from the third memory-write source 103 from selected memory-write locations received from the third memory-write source 103.

The fourth data-preparation circuit 109 may be configured to filter unselected memory-write locations received from the fourth memory-write source 105 from selected memory-write locations received from the fourth memory-write source 105.

Filtering by the third data-preparation circuit 107 may be accomplished by a mapping of the memory locations accessible to the third memory-write source 103 for writing. Bits corresponding to the memory locations may be set to store a setting corresponding to a pass value, which may comprise a high setting or a low setting depending on the embodiment. Write data for memory locations whose corresponding bit has a pass setting may be passed by the third data-preparation circuit 107. And, memory locations whose corresponding bit does not have a pass setting are not passed.

Similarly, filtering by the fourth data-preparation circuit 109 may be accomplished by a mapping of the memory locations accessible to the fourth memory-write source 105 for writing. Bits corresponding to the memory locations may be set to store a setting corresponding to a pass value, which may comprise a high setting or a low setting depending on the embodiment. Write data for memory locations whose corresponding bit has a pass setting may be passed by the fourth data-preparation circuit 109. And, memory locations whose corresponding bit does not have a pass setting are not passed.

Figure 3:
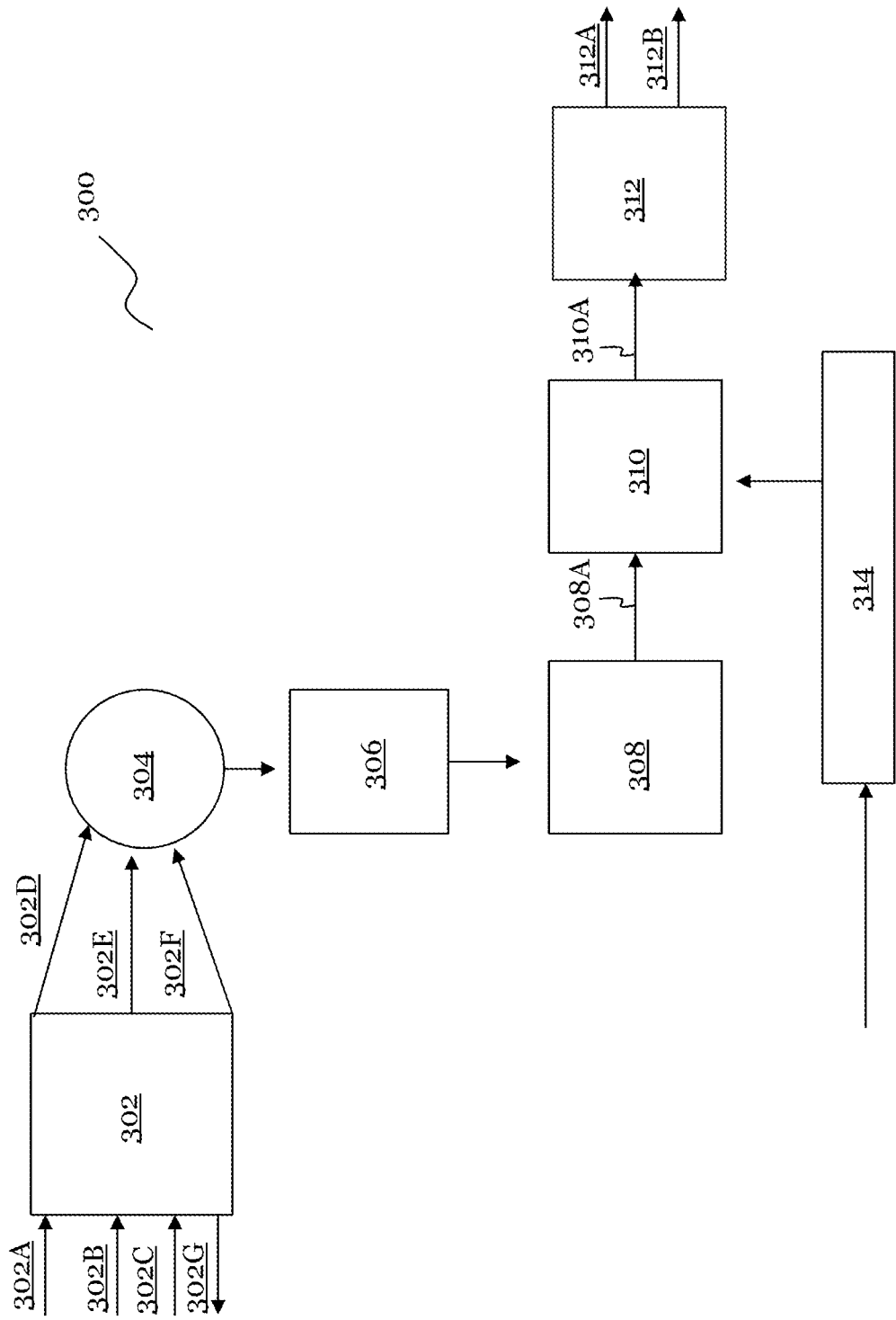
FIG. 3 depicts a trace data preparation circuit consistent with embodiments.

FIG. 3 depicts a data preparation circuit consistent with embodiments.

A trace data preparation circuit 300 may comprise a filtering circuit 302 configured to receive traced memory-write data with addressing data. In various embodiments, the filtering circuit 302 may be programmed to filter address location(s) in a range or up-to single address location of 32/64 bits. In various embodiments, only desired locations data is passed from this stage to next stage.

The filtering circuit 302 may allow the trace data preparation circuit 300 to select only desired data which may be needed for an external measurement tool for analysis. This, in turn, allows the trace data preparation circuit 300 to reduce the trace data bandwidth and reduces the overall instrumentation system complexity by reducing the filtering in software or hardware of measurement tools.

The filtering circuit 302 may filter traced memory-write data depending on the intended destination for a memory-write operation. For example, the tracing circuit may utilize a mapping that corresponds the memory locations accessible by the source of the memory write data with a bit that indicates whether or not to pass memory write data for that location. Mapping examples have been described with reference to FIG. 1 and FIG. 2 so, for brevity, it will not be repeated here. Other filtering methods may be utilized rather than, or in addition to, mappings.

Filtering based on the designated target location for a memory-write location allows the filtering circuit 302 to pass all memory write data for selected locations while culling unwanted information. In various embodiments, an external tool may program which locations are of interest and thus control what information it gets.

In various embodiments, the filtering circuit 302 may comprise an addressing interface 302A to receive addressing bits of traced memory-write location, a data interface 302B to receive data bits of traced memory write data, and a control interface 302C to receive control bits of memory-write data. In various embodiments a memory port interface may comprise an addressing interface, a data interface, and a control interface.

The filtering circuit 302 may comprise an addressing output interface 302D to output addressing bits of selected traced memory-write location, a data output interface 302E to output data bits of selected traced memory write data, and a control output interface 302F to output control bits of selected memory-write data. The output interface 302D, data output interface 302E, and the control output interface 302F may be used to output results after the traced memory-write data received by the filtering circuit 302 have been filtered.

The trace data preparation circuit 300 may also comprise an output 302G to provide a backpressure signal to the source of memory-write data (such as processor 102 or SRAM controller 104). In various embodiments, the output 302G may be coupled internally with FIFO data storage 306 (First In First Out data storage).

In various embodiments, the trace data preparation circuit 300 may comprise a concatenation circuit 304 to concatenate the addressing bits, data bits, and control bits of the selected memory-write data received from the filtering circuit 302. It may be beneficial to consolidate this data for storage into a FIFO data storage 306. In various embodiments, the FIFO data storage 306 may output one traced memory-write data set per clock cycle.

The trace data preparation circuit 300 may further comprise FIFO data storage 306. The FIFO data storage 306 may be coupled with the filtering circuit 302 to receive selected memory-write data after filtering data from unselected memory-write locations by the filtering circuit 302. In various embodiments, the concatenation circuit 304 may be coupled between the filtering circuit 302 and the FIFO data storage 306. The FIFO data storage 306 may be beneficial to reduce the frequency of backpressure signals. Setting a backpressure signal to be triggered at a desired level allows a core and in-system memory controller to work transparently. For example, the backpressure signal may be asserted when the FIFO data storage 306 reaches a threshold capacity. The backpressure signal may be set based on the FIFO fill level.

The threshold capacity for assertion of backpressure signal may differ in various embodiments, and it may depend on the other capabilities of the system 100. For example, a SoC with a faster processor may need a backpressure asserted earlier than a system with a slower processor. As will be appreciated, the size of the FIFO data storage 306, as well as other factors, may also impact when a backpressure signal is asserted or a selected capacity level for assertion of the backpressure signal.

In various embodiments, assertion of the backpressure signal may stall operation of the source providing the memory-write data. This may be true for embodiments where it critical to acquire comprehensive data collection even at the expense of speed. However, as mentioned above, events that trigger the backpressure signal may be picked to minimize times when a backpressure signal is needed.

In various embodiments, the trace data preparation circuit 300 may comprise a data compression circuit 308 coupled with the FIFO data storage 306. The data compression circuit 308 may provide packaging address and data based on the content of the selected memory-write data received from the FIFO data storage 306. The data compression circuit 308 may check selected memory-write data received from the FIFO data storage 306 to determine how data may be compressed and packeted.

To name but a few examples, the data compression circuit 308 may compare an incoming traced memory-write address with a previous traced memory-write address received by the data compression circuit 308. If the two addresses are directed to the same memory location they may be flagged for grouping together in a packet. If the two addresses are directed to continuous memory locations, they may be flagged for grouping. Each of the foregoing examples may be accomplished by comparing addressing data (such as the addressing bits) of traced memory write data of a present cycle with the addressing data from a previous cycle.

In another example, if two write data sets are of a same type (such as aligned double word, half word) they may be flagged for grouping. This may be checked by comparing control data from a traced memory-write data from a current cycle with control from a memory-write data from a previous cycle.

It shall be appreciated that traced memory-write data received by the data compression circuit 308 may also be checked for various other combinations that may present potential grouping opportunities. In various embodiments, there may be in excess of 100 combinations checked to identify compression opportunities. Based on the detected combinations, the data compression circuit 308 may provide information to a packaging circuit 310 to pack input data back to back into a wider-width of output data bus. This principle, in turn, may reduce the total number of clock cycles in which trace data is sent by the output. This can save output bandwidth. Compression may save output bandwidth because it decides the packaging order of input data in the wider-width output data bus.

Packetization may also allow additional data removal from data supplied to an external tool. Control byte and address information may be packed only once in a single packet of memory trace data to save output data bandwidth. For example, address data may only be provided a single time for a set of memory-write data provided for the same, or continuous addresses, that are packeted together instead of providing addressing data for each instance of memory-write data. Other data may also be removed depending on packetization and compression.

The packaging circuit 310 may be configured to group the selected memory-write data and address into packets based on the packaging information received from the data compression circuit 308. For example, continuous traced memory-write data may be packeted and output together. The data compression circuit 308 may assert a signal when continuous memory-write data sets are received. This signal may be provided to the data-packaging circuit and may instruct the packaging circuit 310 to packet the most-recently received memory-write data with the memory-write data from the previous cycle. As long as the signal is asserted from the data compression circuit 308, the packaging circuit 310 may continue to group subsequently-received memory write data. Once, the signal is de-asserted the packaging circuit 310 may output the current packet.

A similar procedure may be followed for other cycles of traced memory-write data identified for grouping. A signal may be asserted by the data compression circuit 308 as combinable address and data are identified. The packaging circuit 310 may packet those address and data together until the signal is de-asserted.

The packaging circuit 310 may take inputs from data compression circuit 308 and pack continuous and aligned data back to back with control byte and address information. The width of an output bus 310A of the packaging circuit 310 may be bigger than the width of an output bus 308A of the data compression circuit 308. This may allow packets of traced memory-write data with address to be output from the data package circuit rather than outputting data corresponding to one write operation at a time.

In various embodiments, it may take more than one output cycle of the output bus 310A to output a packet traced memory-write data. For example, if one packet of continuous memory-write data fills the output bus 310A, a first cycle may output a first portion of the memory-write data and a second cycle may output additional memory-write data of the same packet. Addressing information may only need to be output one time for the entire packet. Additional cycles may also be utilized until a signal is indicating combinable data is identified is de-asserted. Similarly, if the signal is de-asserted before a bus is full, it may be output without all the bits of the bus being filled with data.

In various embodiments, the trace data preparation circuit 30o may also comprise an output controller 312 configured to receive packets from the packaging circuit and convert the packets into a standard protocol format. The output controller may receive packed data and provides it to trace downstream infrastructure of SoC (such as the data-collection network 110). It may utilize a standard interface protocol like ARM's Advance Trace Bus (ATB). Trace out data may be output at a trace out data output 312A and trace out control data may be output at a trace out control output 312B. The control output 312B may provide control data that may decoded by slave that receives trace data for further processing.

The trace data preparation circuit 30o may also comprise a timestamp circuit 314. The timestamp circuit 314 may be a programmable unit that can add timestamp data to trace data after an interval. For example, the timestamp circuit 314 may count output cycles until the interval is reached. If the interval is set to five cycles, the timestamp may be added to every fifth cycle.

Timestamp data may be used by the external tool to correlate data from various sources on time-scale. This may be beneficial for tracking when writes occur. As has been discussed, a system to prepare trace data may comprise many data-preparation circuits so it may be advantageous to timestamp outputs. Timestamps may also be utilized by external tools to order the write address and data after they have been unpacked.

The interval between time stamps may be programmable. For example, it may be programmable by the external tool. The interval may be stored in a memory location that is accessible by the external tool to write. Communication may be carried from an external tool by means of a bus. As will be appreciated, it may be beneficial to reduce the interval the higher the number of data-preparation circuits in a system or depending on the needs of the external tool.

Figure 4:
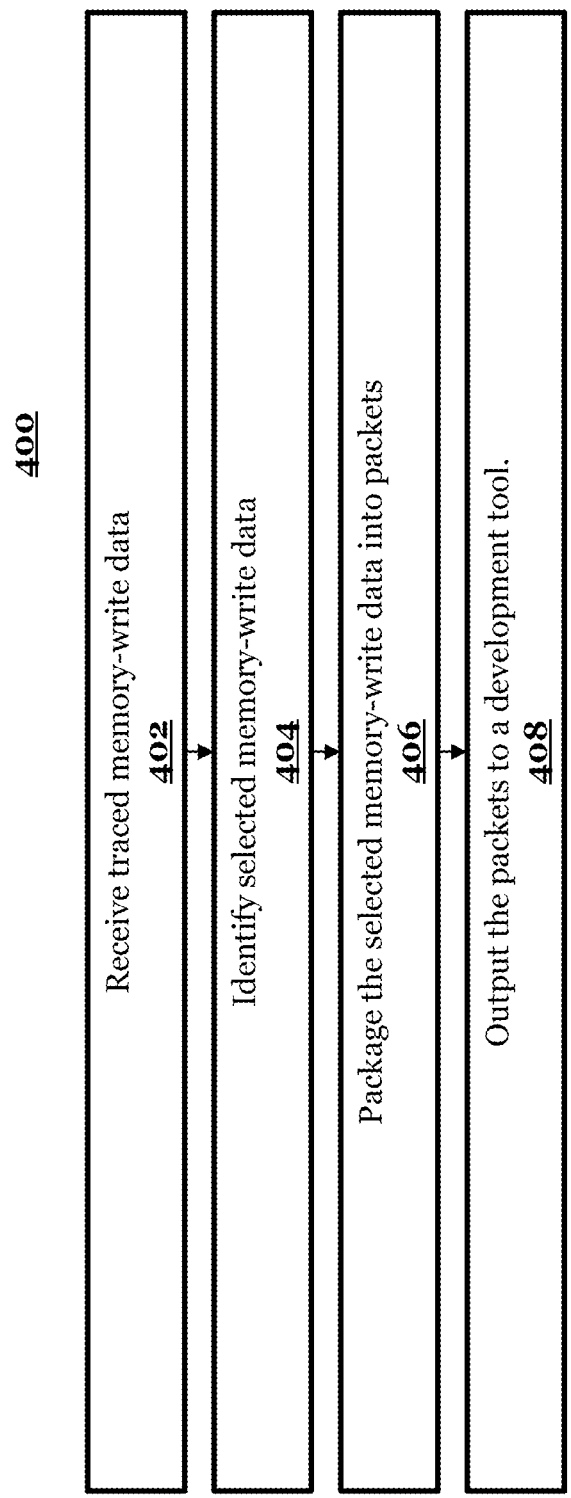
FIG. 4 depicts a flow chart for a method to provided filtered trace data consistent with embodiments.

FIG. 4 depicts a flow chart for a method to provided filtered trace data consistent with embodiments.

In various embodiments, a method 400 to prepare filtered trace data includes at a step 402, receiving traced memory-write data; at a step 404 identifying selected memory-write locations; at a step 406, packaging the selected memory-write address and data into packets; and at a step 408, outputting the packets to a development tool.

In various embodiments, the method 400 may further comprise converting the packets into a standard format for output.

In various embodiments, the method 400, wherein identifying selected memory-write data comprises selecting memory-write address for selected memory locations.

In various embodiments, the method 400, may further comprise analyzing the selected memory-write locations to determine how to package selected memory-write data.

In various embodiments, the method 400 may further comprise, wherein analyzing the selected memory-write data comprises determining whether memory write locations are directed to continuous addresses, directed to discontinuous addresses, and are of a same type.

Various figures depict circuits and other components with block figures. These figures should not be taken to mark the physical boundaries of the corresponding components. As will be appreciated, physical components may be dispersed throughout a SoC.

Example 1. A system to provide filtered trace data, the system including a processor; a Static Random Access Memory (SRAM) controller; a first data-preparation circuit coupled with the processor to receive traced memory-write data from the processor, the first data-preparation circuit being configured to filter unselected traced memory-write data from selected traced memory-write data; a second data-preparation circuit coupled with the SRAM controller to receive traced memory-write data from the SRAM controller, the second data-preparation circuit configured to filter unselected traced memory-write data from selected traced memory-write data; a data-collection network configured to receive the selected traced memory-write data from the first data-preparation circuit and to receive the selected traced memory-write data from the second data-preparation circuit; and an output interface coupled with the data-collection network to output the selected traced memory-write data from the first data-preparation circuit and the selected traced memory-write data from the second data-preparation circuit.

Example 2. The system of Example 1, wherein the processor includes a tightly coupled memory and the traced memory-write data from the processor corresponds to memory-write data operations for the tightly coupled memory.

Example 3. The system of Example 1 or Example 2, wherein the SRAM controller is in communication with a corresponding processor or a non-processor master and the traced memory-write data from the SRAM controller corresponds to memory-write data operations for memory accessible by the processor or the non-processor master.

Example 4. The system of Example 1 through Example 3, wherein the traced memory-write-data from the processor includes addressing bits, data bits, and control bits, and the traced memory-write data from the SRAM controller includes addressing bits, data bits, and control bits.

Example 5. The system of Example 1 through Example 4, wherein the first data-preparation circuit is configured to identify the selected traced memory-write data of the traced memory-write data from the processor based on a mapping of selected memory locations.

Example 6. The system of Example 1 through Example 5, wherein the second data-preparation circuit is configured to identify the selected memory-write data of the traced memory-write data from the SRAM controller based on mapping of selected memory locations.

Example 7. The system of Example 1 through Example 6, wherein the first data-preparation circuit includes a filtering circuit to filter the unselected traced memory-write data from the selected traced memory-write data and a First In First Out buffer to store the selected traced memory-write data.

Example 8. The system of Example 1 through Example 7, wherein the first data-preparation circuit is configured to assert a backpressure signal provided to the processor in response to the First in First out buffer reaching a full capacity.

Example 9. The system of Example 1 through Example 8, wherein the first data-preparation circuit includes a data compressions circuit configured to identify packets of selected traced memory-write data and provide packaging data to a data packaging circuit of the first data-preparation circuit to group the selected traced memory-write data into packets with address and control information.

Example 10. The system of Example 1 through Example 9, wherein the first data-preparation circuit further includes a time stamp circuit configured to add timestamps to the packets.

Example 11. The system of Example 1 through Example 4, further including a trace-out controller coupled with the data packaging circuit to receive packets and provide them to the data-collection network.

Example 12. A method to filter trace data, the method including receiving traced memory-write data; identifying selected memory-write data; packaging the selected memory-write data into packets; and outputting the packets to a development tool.

Example 13. The method of Example 12, further including converting the packets into a standard format for output.

Example 14. The method of Example 12 or Example 13, wherein identifying selected traced memory-write data includes selecting memory-write data for selected memory locations.

Example 15. The method of Example 12 through Example 14, wherein the traced memory-write data includes address bits, data bits and control bits.

Example 16. The method of Example 12 through Example 15, wherein the selected memory-write data is packaged into packets with control bytes.

Example 17. The method of Example 12 through Example 16, further including analyzing the selected memory-write data to determine how to package the selected memory-write data.

Example 18. The method of Example 12 through Example 17, wherein analyzing the selected memory-write data includes determining whether the selected memory write data corresponds to memory-write data operations directed to continuous addresses, directed to discontinuous addresses, and are of a same type.

Example 19. A trace-data preparation circuit including a filtering circuit configured to receive traced memory-write data; a First In First Out buffer coupled with the filtering circuit to receive selected memory-write data filtered by the filtering circuit; a data compression circuit coupled with the First in First Out buffer configured to provide packaging data based on content of the selected memory-write data; a packaging circuit configured to group the selected memory-write data into packets based on the packaging data; and an output controller configured to receive packets from the packaging circuit and convert the packets into a standard protocol format.

Example 20. The trace-data preparation circuit of Example 19, further including a timestamp circuit configured to add a time stamp to every nth packet, n being an integer.

Example 21. The trace-data preparation circuit of Example 19 or Example 20, wherein an output bus for the packaging circuit is configured to transmit more bits per cycle than an input bus for the packaging circuit.

Example 22. The method of Example 19 though Example 21, wherein the traced memory-write data received by the filtering circuit includes addressing bits, data bits, and control bits.

Example 23. The method of Example 19 though Example 22, wherein the filtering circuit includes an address input to receive addressing bits, a data input to receive data bits, a control input to receive control bits, an addressing output to provide addressing bits, a data output to provide data bits, and a control output to provide control bits.

Example 24. The method of Example 19 though Example 23, further including a concatenation circuit to receive addressing bits from the filtering circuit, data bits from the filtering circuit, and control bits from the filtering circuit, the concatenation circuit being configured to concatenate addressing bits, data bits, and control bits and provide them to the First in First Out Buffer.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A system to provide filtered trace data, the system comprising:
   a processor;
   a Static Random Access Memory (SRAM) controller;
   a first data-preparation circuit coupled with the processor to receive first traced memory-write data from the processor, the first data-preparation circuit configured to filter first unselected traced memory-write data from first selected traced memory-write data;
   a second data-preparation circuit coupled with the SRAM controller to receive second traced memory-write data from the SRAM controller, the second data-preparation circuit configured to filter second unselected traced memory-write data from second selected traced memory-write data;
   a data-collection network configured to receive the first selected traced memory-write data and the second selected traced memory-write data; and
   an output interface coupled with the data-collection network to output the first selected traced memory-write data and the second selected traced memory-write data.

2. The system of claim 1, wherein the processor comprises a tightly coupled memory and the first traced memory-write data corresponds to memory-write data operations for the tightly coupled memory.

3. The system of claim 1, wherein the SRAM controller is in communication with a corresponding processor or a non-processor master and the second traced memory-write data corresponds to memory-write data operations for memory accessible by the processor or the non-processor master.

4. The system of claim 1, wherein the first traced memory-write data comprises addressing bits, data bits, and control bits, and wherein the second traced memory-write data comprises addressing bits, data bits, and control bits.

5. The system of claim 1, wherein the first data-preparation circuit is configured to identify the first selected traced memory-write data of the first traced memory-write data based on a mapping of selected memory locations.

6. The system of claim 1, wherein the second data-preparation circuit is configured to identify the second selected traced memory-write data of the second traced memory-write data based on mapping of selected memory locations.

7. The system of claim 1, wherein the first data-preparation circuit comprises a filtering circuit to filter the first unselected traced memory-write data from the first selected traced memory-write data and a First In First Out buffer to store the first selected traced memory-write data.

8. The system of claim 7, wherein the first data-preparation circuit is configured to assert a backpressure signal provided to the processor in response to the First in First out buffer reaching a full capacity.

9. The system of claim 7, wherein the first data-preparation circuit comprises a data compression circuit configured to identify packets of first selected traced memory-write data and provide packaging data to a data packaging circuit of the first data-preparation circuit to group the first selected traced memory-write data into packets with address and control information.

10. The system of claim 9, wherein the first data-preparation circuit further comprises a time stamp circuit configured to add timestamps to the packets.

11. The system of claim 9, further comprising a trace-out controller coupled with the data packaging circuit to receive packets and provide them to the data-collection network.

12. A trace-data preparation circuit comprising:
a filtering circuit configured to receive traced memory-write data;
a First In First Out buffer coupled with the filtering circuit to receive selected memory-write data filtered by the filtering circuit;
a data compression circuit coupled with the First in First Out buffer configured to provide packaging data based on content of the selected memory-write data;
a packaging circuit configured to group the selected memory-write data into packets based on the packaging data; and
an output controller configured to receive packets from the packaging circuit and convert the packets into a standard protocol format.

13. The trace-data preparation circuit of claim 12, further comprising a timestamp circuit configured to add a time stamp to every nth packet, n being an integer.

14. The trace-data preparation circuit of claim 12, wherein an output bus for the packaging circuit is configured to transmit more bits per cycle than an input bus for the packaging circuit.

15. The trace-data preparation circuit of claim 12, wherein the traced memory-write data received by the filtering circuit comprises addressing bits, data bits, and control bits.

16. The trace-data preparation circuit of claim 12, wherein the filtering circuit comprises an address input to receive addressing bits, a data input to receive data bits, a control input to receive control bits, an addressing output to provide addressing bits, a data output to provide data bits, and a control output to provide control bits.

17. The trace-data preparation circuit of claim 12, further comprising a concatenation circuit to receive addressing bits from the filtering circuit, data bits from the filtering circuit, and control bits from the filtering circuit, the concatenation circuit being configured to concatenate addressing bits, data bits, and control bits and provide them to the First in First Out Buffer.

18. A method, comprising:
receiving, by a filtering circuit, traced memory-write data;
receiving, by a First In First Out (FIFO) buffer coupled to the filter circuit, selected memory-write data filtered by the filtering circuit;
provide, by a data compression circuit coupled to the FIFO buffer, packaging data based on contents of the selected memory-write data;
grouping, by a packaging circuit, the selected memory-write data into packets based on the packaging data;
receiving, by an output controller, packets from the packaging circuit; and
converting, by the output controller, the packets into a standard protocol format.

19. The method of claim 18, wherein the traced memory-write data received by the filtering circuit comprises addressing bits, data bits, and control bits.

20. The method of claim 18, wherein the selected memory-write data is packaged into packets with control bytes.

21. The method of claim 18, further comprising adding, by a timestamp circuit, a time stamp to every nth packet, n being an integer.

22. The method of claim 18, further comprising analyzing the selected memory-write data to determine how to package the selected memory-write data.

23. The method of claim 22, wherein analyzing the selected memory-write data comprises determining whether the selected memory-write data corresponds to memory-write data operations directed to continuous addresses, directed to discontinuous addresses, and are of a same type.

24. The method of claim 18, further comprising further comprising:
receiving, by a concatenation circuit, addressing bits from the filtering circuit, data bits from the filtering circuit, and control bits from the filtering circuit;
concatenating, by the concatenation circuit, addressing bits, data bits, and control bits; and
providing the concatenated address bits, concatenated data bits, and concatenated control bits to the First in First Out Buffer.

* * * * *